J. C. R. MARCH.
FLY WHEEL.
APPLICATION FILED NOV. 26, 1912.
1,076,219.
Patented Oct. 21, 1913.
2 SHEETS—SHEET 1.
FIG. I.
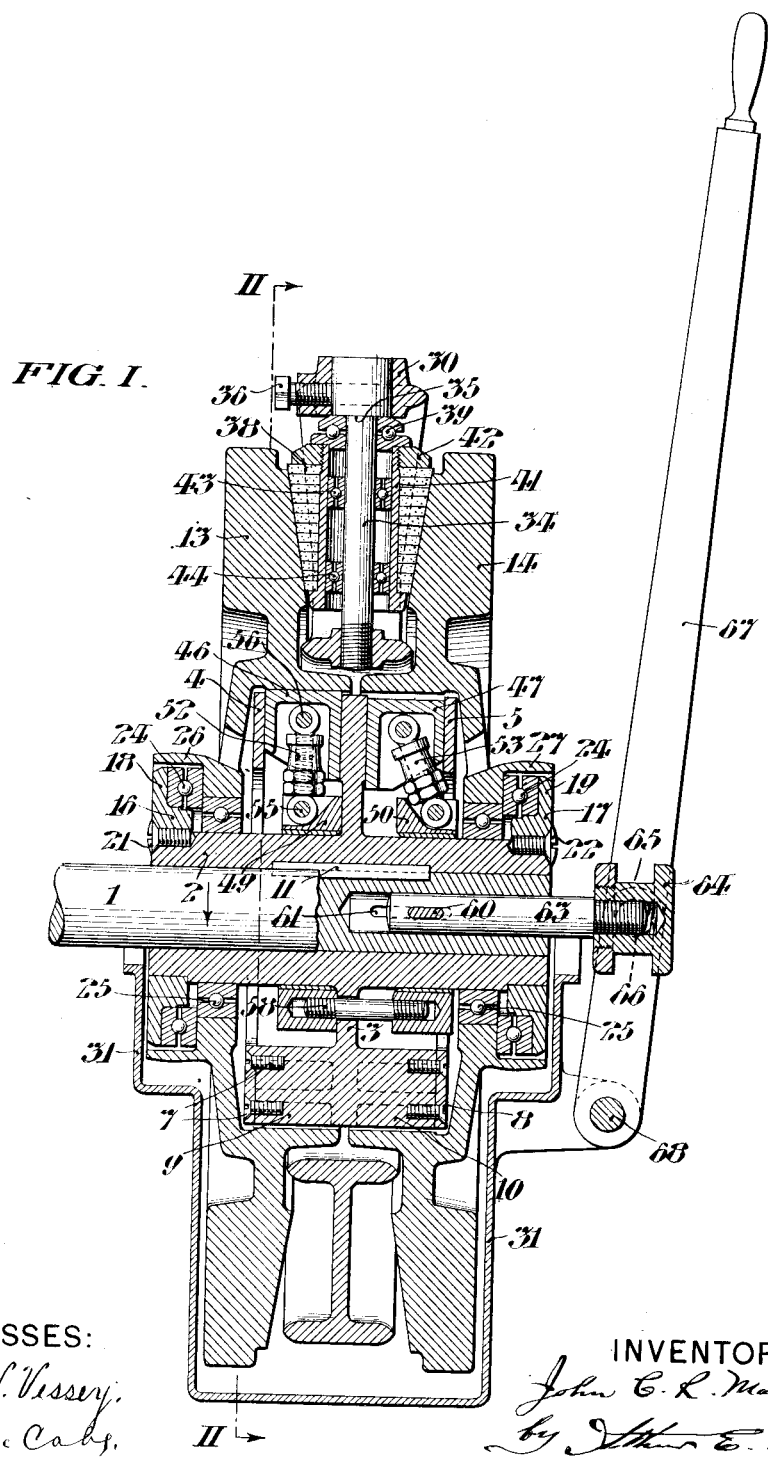
WITNESSES:
Philip W. Vissey.
James McCabe.
INVENTOR:
John C. R. March,
by Arthur E. Paige,
Attorney.

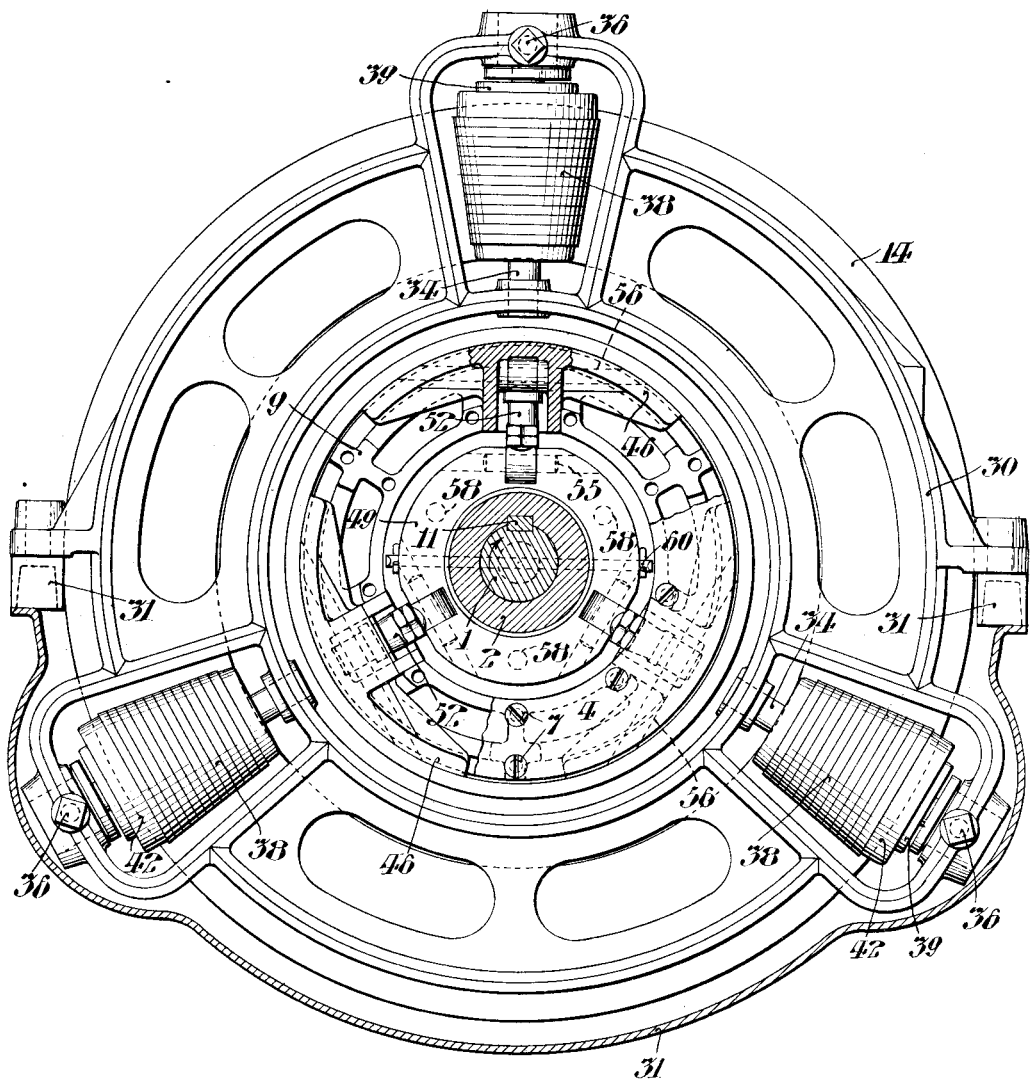

UNITED STATES PATENT OFFICE.

JOHN C. R. MARCH, OF PERTH AMBOY, NEW JERSEY.

FLY-WHEEL.

1,076,219.   Specification of Letters Patent.   Patented Oct. 21, 1913.

Application filed November 26, 1912. Serial No. 733,714.

*To all whom it may concern:*

Be it known that I, JOHN C. R. MARCH, of Perth Amboy, in the State of New Jersey, have invented a certain new and useful Improvement in Fly-Wheels, whereof the following is a specification, reference being had to the accompanying drawings.

My invention relates to fly wheels for engines which must be quickly reversed and may be employed with particular advantage in connection with internal combustion marine engines.

As hereinafter described my invention includes a sleeve rigidly connected with the engine crank shaft and carrying two opposite counterpart beveled wheels which are normally loose on said sleeve but operatively connected with each other and provided with means whereby they may be alternately rigidly connected with said sleeve; whereby said wheels may be simultaneously rotated in opposite directions in connection with said crank shaft; the latter being rigidly connected with one or the other of said wheels in accordance with the direction of rotation of said crank shaft, and instantaneous reversal of the engine be thus effected without interrupting the continuous rotation of said wheels in opposite directions.
My invention includes the various novel features of construction and arrangement hereinafter more definitely specified.

In the drawings; Figure I is a vertical sectional view of a fragment of an engine crank shaft having a convenient embodiment of my invention applied thereto. Fig. II is a fragmentary vertical sectional view taken on the line II, II in Fig. I, omitting the wheel which comes in the plane of section.

In said figures; the main shaft 1, which is the engine crank shaft is provided with a sleeve 2 having the central annular flange 3 and two outer annular flanges 4 and 5 respectively connected with said central flange 3 by the screws 7 and 8 engaging the respective lugs 9 and 10 on said central flange as shown in Fig. I. Said sleeve 2 is rigidly connected with said shaft 1, conveniently by the key 11, and carries the two opposite counterpart beveled wheels 13 and 14 which are normally loose on said sleeve but held thereon by the terminal collars 16 and 17 on said sleeve having flanges 18 and 19 extending transversely with respect to the axis thereof; said collars being axially adjustable and normally held by the respective screws 21 and 22. As shown in Fig. I two ball bearings 24 and 25 are provided for each of said wheels respectively interposed between the wheel hubs 26 and 27 and said sleeve 2 and between said wheel hubs and said terminal flanges 16 and 17. The annular frame 30 surrounds said shaft 1 and sleeve 2 between said wheels 13 and 14 and is held stationary on the engine frame 31 as indicated in Fig. II. Said frame 30 carries a series, conveniently 3, of pinion shafts 34 having screw threaded inner ends in engagement therewith and having annular shoulders 35 at their outer ends. Each of said shafts 34 is provided with clamping means, conveniently the set screws 36 in engagement with said frame 30, arranged to secure said shafts in adjusted position. The beveled pinions 38 are respectively mounted on said pinion shafts 34 in frictional engagement with the opposed beveled faces of said wheels 13 and 14, and ball bearings 39 are interposed between said pinions 38 and the shoulders 35 on said pinion shafts 34 so that said pinions may be radially adjusted with respect to said main shaft 1 to compensate for wear of the friction surfaces of said pinions which are conveniently formed of rings of raw hide, as indicated in Fig. I, which are secured in compact relation on the pinion hubs 41 by the nuts 42. Said pinion shafts 34 being stationary, are each provided with two ball bearings 43 and 44 in said pinion hubs 41.

Said wheels 13 and 14 being operatively connected by the friction pinions 38 as above described, it is to be understood that rotation of either of said wheels effects rotation of the other, but in the opposite direction. Means are provided whereby said wheels 13 and 14 may be alternately rigidly connected with said sleeve 2, including two series of friction shoes 46 and 47 arranged to slide radially upon opposite sides of said central flange 3 between said outer flanges 4 and 5. The collars 49 and 50 are fitted to slide axially on said sleeve 2 upon opposite sides of said central flange 3 and have toggle levers 52 and 53, including means arranged to vary their length, and respectively pivotally connecting said collars and friction shoes as shown in Fig. I. As shown in Fig. II the inner ends of said toggle levers are connected with the collars by pivot pins 55 which extend tangentially in the collars, and, similarly, said toggle levers are connected with the respective shoes by pivot pins 56 which extend tangentially in said shoes. As indicated at the left hand side of Fig. I said toggle levers may be conveniently made variable in length by forming them in separable sections connected by a nut engaging the screw threads extending in respectively opposite directions upon the respective sections. Said collars 49 and 50 are connected by the yoke bars 58 which extend through said central flange 3 on the sleeve 2. Said collar 50 carries the cross bar 60 in rigid relation therewith extending diametrically through elongated slots 61 extending through said shaft 1 and sleeve 2 as indicated in Fig. I, permitting axial movement of said collar and cross bar, and, the plunger 63 is fitted to reciprocate axially in said main shaft 1 in engagement with said cross bar 60 and provided with means arranged to reciprocate said collars 49 and 50 by said plunger, including the head 64 on said plunger having the groove 65 engaging the stud 66 on the hand lever 67 which is conveniently fulcrumed at 68 on the engine frame or casing 31.

It is to be understood that when said shaft 1 rotates in the direction indicated by the arrows shown in Figs. I and II it carries and drives the wheel 13 in the same direction, by engagement of the shoes 46 as shown in Fig. II, and, simultaneously drives the wheel 14 in the opposite direction. Thereupon, if it is desired to reverse the engine, the plunger 63 is shifted to release the shoes 46 from the wheel 13 and engage the shoes 47 with the wheel 14 so that the momentum of the latter is utilized to start the engine in reverse direction. It may be observed that the toggle levers 52 and 53 are adjusted to such length that in the intermediate position of said collars 49 and 50 both wheels 13 and 14 are loose from said sleeve 2 and free to continue their rotation in respectively opposite directions independently of said sleeve and the shaft 1.

I do not desire to limit myself to the precise details of construction and arrangement herein set forth as it is obvious that various modifications may be made therein without departing from the essential features of my invention as defined in the appended claims.

I claim:—

1. The combination with a main shaft; of a sleeve having a central annular flange and two outer annular flanges upon opposite sides thereof; means rigidly connecting said sleeve with said shaft; two opposite counterpart beveled wheels normally loose on said sleeve; terminal collars on said sleeve having flanges extending transversely with respect to the axis thereof; two ball bearings for each of said wheels respectively interposed between the wheel hubs and said sleeve and between the wheel hubs and said terminal flanges; a stationary frame surrounding said shaft between said wheels; pinion shafts having screw threaded inner ends in engagement with said frame and having annular shoulders at their outer ends; clamping means arranged to secure said shafts in adjusted position; beveled pinions on said pinion shafts respectively in frictional engagement with the opposed beveled faces of said wheels; ball bearings interposed between said pinions and the heads on said shafts; whereby said pinions may be radially adjusted with respect to said main shaft; means whereby said wheels may be alternately rigidly connected with said sleeve, including two series of friction shoes arranged to slide radially upon opposite sides of said central flange between said outer flanges, collars fitted to slide axially on said sleeve upon opposite sides of said central flange, toggle levers having means arranged to vary their length and respectively pivotally connecting said collars and friction shoes, a yoke bar connecting said two collars through said central flange, a cross bar, carried by one of said collars, extending diametrically through elongated slots in said sleeve and main shaft, permitting axial movement of said collar and cross bar, a plunger fitted to reciprocate axially in said main shaft in engagement with said cross bar, and, means arranged to reciprocate said collars by said plunger, including a grooved head on said plunger, and a hand lever having a stud engaging the groove in said plunger head.

2. The combination with a main shaft; of a sleeve having a central annular flange and two outer annular flanges upon opposite sides thereof; means rigidly connecting said sleeve with said shaft; two opposite counterpart beveled wheels normally loose on said sleeve; terminal collars on said sleeve having flanges extending transversely with respect to the axis thereof; a stationary frame surrounding said shaft between said wheels; pinion shafts having screw threaded inner ends in engagement with said frame and having annular shoulders at their outer ends; clamping means arranged to secure said shafts in adjusted position; beveled pinions on said pinion shafts in frictional engagement with the opposed beveled faces of said wheels; whereby said pinions may be radially adjusted with respect to said main shaft; means whereby said wheels may be alternately rigidly connected with said sleeve, including two series of friction shoes arranged to slide radially upon opposite sides of said central flange between said outer flanges, collars fitted to slide axially on said sleeve upon opposite sides of said central flange, toggle levers having means arranged to vary their length and respectively pivotally connecting said collars and friction shoes, a yoke bar connecting said two collars through said central flange, a cross bar, carried by one of said collars, extending diametrically through elongated slots in said sleeve and main shaft, permitting axial movement of said collar and cross bar, and, a plunger fitted to reciprocate axially in said main shaft in engagement with said cross bar.

3. The combination with a main shaft; of a sleeve having a central annular flange; means rigidly connecting said sleeve with said shaft; two opposite beveled wheels normally loose on said sleeve; a stationary frame between said wheels; pinion shafts having screw threaded inner ends in engagement with said frame and having shoulders at their outer ends; clamping means arranged to secure said shafts in adjusted position; beveled pinions on said pinion shafts in frictional engagement with the opposed beveled faces of said wheels; whereby said pinions may be radially adjusted with respect to said main shaft; means whereby said wheels may be alternately rigidly connected with said sleeve, including friction shoes arranged to slide radially upon opposite sides of said central flange, collars fitted to slide axially on said sleeve upon opposite sides of said central flange, toggle levers respectively pivotally connecting said collars and friction shoes, a yoke bar connecting said two collars, a cross bar, carried by one of said collars, extending diametrically through elongated slots in said sleeve and main shaft, permitting axial movement of said collar and cross bar, and, a plunger fitted to reciprocate axially in said main shaft in engagement with said cross bar.

4. The combination with a main shaft; of a sleeve having a central annular flange; means rigidly connecting said sleeve with said shaft; two opposite beveled wheels normally loose on said sleeve; a stationary frame between said wheels; pinion shafts having screw threaded inner ends in engagement with said frame and having shoulders at their outer ends; clamping means arranged to secure said shafts in adjusted position; beveled pinions on said pinion shafts in frictional engagement with the opposed beveled faces of said wheels; whereby said pinions may be radially adjusted with respect to said main shaft; means whereby said wheels may be alternately rigidly connected with said sleeve, including friction shoes arranged to slide radially upon opposite sides of said central flange, collars fitted to slide axially on said sleeve upon opposite sides of said central flange, toggle levers respectively pivotally connecting said collars and friction shoes, a yoke bar connecting said two collars, and, means arranged to reciprocate said collars.

5. The combination with a main shaft; of a sleeve having a central annular flange; means rigidly connecting said sleeve with said shaft; two opposite beveled wheels normally loose on said sleeve; a stationary frame between said wheels; pinion shafts having screw threaded inner ends in engagement with said frame and having shoulders at their outer ends; clamping means arranged to secure said shafts in adjusted position; beveled pinions on said pinion shafts in frictional engagement with the opposed beveled faces of said wheels; whereby said pinions may be radially adjusted with respect to said main shaft; means whereby said wheels may be alternately rigidly connected with said sleeve, including friction shoes arranged to slide radially upon opposite sides of said central flange, collars fitted to slide axially on said sleeve upon opposite sides of said central flange, toggle levers respectively pivotally connecting said collars and friction shoes, means connecting said collars, and means arranged to reciprocate said collars.

6. The combination with a main shaft; of a sleeve having a central annular flange; means rigidly connecting said sleeve with said shaft; two opposite beveled wheels normally loose on said sleeve; a stationary frame between said wheels; pinion shafts in engagement with said frame; beveled pinions on said pinion shafts in frictional engagement with the opposed beveled faces of said wheels; means whereby said pinions may be radially adjusted with respect to said main shaft; means whereby said wheels may be alternately rigidly connected with said sleeve, including friction shoes arranged to slide radially upon opposite sides of said central flange, collars fitted to slide axially on said sleeve upon opposite sides of said central flange, toggle levers respectively pivotally connecting said collars and friction shoes, a yoke bar connecting said two collars, a cross bar, carried by one of said collars, extending diametrically through elongated slots in said sleeve and main shaft, permitting axial movement of said collar and cross bar, and, a plunger fitted to reciprocate axially in said main shaft in engagement with said cross bar.

7. The combination with a main shaft; of a sleeve having a central annular flange; means rigidly connecting said sleeve with said shaft; two opposite beveled wheels normally loose on said sleeve; a stationary frame between said wheels; pinion shafts in engagement with said frame; beveled pinions on said pinion shafts in frictional engagement with the opposed beveled faces of said wheels; means whereby said wheels may be alternately rigidly connected with said sleeve, including friction shoes arranged to slide radially upon opposite sides of said central flange, collars fitted to slide axially on said sleeve upon opposite sides of said central flange, toggle levers respectively pivotally connecting said collars and friction shoes, a yoke bar connecting said two collars, a cross bar, carried by one of said collars, extending diametrically through elongated slots in said sleeve and main shaft, permitting axial movement of said collar and cross bar, and, a plunger fitted to reciprocate axially in said main shaft in engagement with said cross bar.

8. The combination with a main shaft; of a sleeve; means rigidly connecting said sleeve with said shaft; two opposite beveled wheels normally loose on said sleeve; a stationary frame between said wheels; pinion shafts having screw threaded inner ends in engagement with said frame and having shoulders at their outer ends; clamping means arranged to secure said shafts in adjusted position; beveled pinions on said pinion shafts in frictional engagement with the opposed beveled faces of said wheels; whereby said pinions may be radially adjusted with respect to said main shaft; means whereby said wheels may be alternately rigidly connected with said sleeve, including friction shoes arranged to reciprocate radially, a collar fitted to slide axially on said sleeve, toggle levers connecting said collar and friction shoes, a cross bar, carried by said collar, extending diametrically through elongated slots in said sleeve and main shaft, permitting axial movement of said collar and cross bar, and, a plunger fitted to reciprocate axially in said main shaft in engagement with said cross bar.

9. The combination with a main shaft; of a sleeve; means rigidly connecting said sleeve with said shaft; two opposite beveled wheels normally loose on said sleeve; a stationary frame between said wheels; pinion shafts in engagement with said frame; beveled pinions on said pinion shafts in frictional engagement with the opposed beveled faces of said wheels; means whereby said wheels may be alternately rigidly connected with said sleeve, including friction shoes arranged to reciprocate radially, a collar fitted to slide axially on said sleeve, toggle levers respectively pivotally connecting said collar and friction shoes, a cross bar, carried by said collar, extending diametrically through elongated slots in said sleeve and main shaft, permitting axial movement of said collar and cross bar, and, a plunger fitted to reciprocate axially in said main shaft in engagement with said cross bar.

10. The combination with a main shaft; of a sleeve; means rigidly connecting said sleeve with said shaft; two opposite beveled wheels normally loose on said sleeve; a stationary frame between said wheels; pinion shafts in engagement with said frame; beveled pinions on said pinion shafts in frictional engagement with the opposed beveled faces of said wheels; means whereby said wheels may be alternately rigidly connected with said sleeve, including friction shoes arranged to reciprocate radially, a collar fitted to slide axially on said sleeve, toggle levers respectively pivotally connecting said collar and friction shoes, and, means arranged to reciprocate said collar.

11. The combination with a main shaft; of two opposite counterpart beveled wheels normally loose on said shaft; a stationary frame between said wheels; pinion shafts having screw threaded inner ends in engagement with said frame and having annular shoulders at their outer ends; clamping means arranged to secure said shafts in adjusted position; beveled pinions on said pinion shafts in frictional engagement with the opposed beveled faces of said wheels; whereby said pinions may be radially adjusted with respect to said main shaft; means whereby said wheels may be alternately rigidly connected with said shaft, including friction shoes arranged to reciprocate radially, a collar fitted to slide axially on said sleeve, toggle levers connecting said collar and friction shoes, and, means arranged to reciprocate said collar.

12. The combination with a main shaft; of two opposite beveled wheels normally loose on said shaft; a stationary frame between said wheels; pinion shafts in said frame; beveled pinions on said pinion shafts in frictional engagement with the opposed beveled faces of said wheels; means whereby said pinions may be radially adjusted with respect to said main shaft; means whereby said wheels may be alternately rigidly connected with said shaft, including friction shoes arranged to reciprocate radially, a collar fitted to slide axially on said sleeve, toggle levers connecting said collar and friction shoes, and, means arranged to reciprocate said collar.

13. The combination with a main shaft; of two opposite beveled wheels normally loose on said shaft; a stationary frame between said wheels; pinion shafts in said frame; beveled pinions on said pinion shafts in frictional engagement with the opposed beveled faces of said wheels; means whereby said wheels may be alternately rigidly connected with said shaft, including friction shoes arranged to reciprocate radially, a collar fitted to slide axially on said sleeve, toggle levers connecting said collar and friction shoes, and, means arranged to reciprocate said collar.

14. The combination with a main shaft; of two opposite beveled wheels normally loose on said shaft; a stationary frame between said wheels; pinion shafts in said frame; beveled pinions on said pinion shafts in frictional engagement with the opposed beveled faces of said wheels; means whereby said wheels may be alternately rigidly connected with said shaft, including friction shoes arranged to reciprocate radially, a collar fitted to slide axially on said sleeve, means operatively connecting said collar and friction shoes, and, means arranged to reciprocate said collar.

15. The combination with a main shaft; of two opposite beveled wheels normally loose on said shaft; a frame between said wheels; pinion shafts in said frame; beveled pinions on said pinion shafts in frictional engagement with the opposite beveled faces of said wheels; and means whereby said pinions may be radially adjusted with respect to said main shaft, to compensate for wear, including screw threads on said pinion shafts and means carried by said shafts bearing upon said pinions.

16. The combination with a main shaft; of two opposite beveled wheels normally loose on said shaft; a frame between said wheels; pinion shafts in said frame; pinions on said pinion shafts having resilient faces in frictional engagement with the opposed beveled faces of said wheels; and, means whereby said pinions may be radially adjusted.

In testimony whereof, I have hereunto signed my name at Perth Amboy, New Jersey, this eleventh day of November, 1912.

JOHN C. R. MARCH.

Witnesses:
E. JACKSON,
OLGA JORGENSEN.

Copies of this patent may be obtained for five cents each, by addressing the "Commissioner of Patents, Washington, D. C."